US006761783B2

United States Patent
Keller et al.

(10) Patent No.: US 6,761,783 B2
(45) Date of Patent: Jul. 13, 2004

(54) PROCESS METHOD TO REPAIR BISMALEIMIDE (BMI) COMPOSITE STRUCTURES

(75) Inventors: Russell L. Keller, Maple Valley, WA (US); Wesley S. Owen, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 200 days.

(21) Appl. No.: 10/119,562

(22) Filed: Apr. 9, 2002

(65) Prior Publication Data

US 2003/0188821 A1 Oct. 9, 2003

(51) Int. Cl.[7] .............................................. B32B 35/00
(52) U.S. Cl. ......................... 156/94; 156/98; 156/286; 156/289; 156/311
(58) Field of Search .............................. 156/87, 90, 94, 156/98, 152, 285, 286, 289, 307.1, 307.3, 307.4, 311; 264/36.1, 36.22, 101, 102; 244/133; 428/63; 29/402.01, 402.09, 402.11; 52/514

(56) References Cited

U.S. PATENT DOCUMENTS

| 5,236,646 A | | 8/1993 | Cochran et al. |
| 5,492,466 A | * | 2/1996 | Frailey .................. 425/389 |
| 5,618,606 A | | 4/1997 | Sherrick et al. |
| 5,958,166 A | | 9/1999 | Walters et al. |

OTHER PUBLICATIONS

Klein, Allen J., Repair of Composites, Advanced Composites, Jul./Aug. 1987, p. 51–52, 54–56, 60,62.*

* cited by examiner

Primary Examiner—Gladys JP Corcoran
(74) Attorney, Agent, or Firm—Shimokaji & Associates, P.C.

(57) ABSTRACT

A method for repairing a damaged area, referred to as the repair area, of a composite structure comprises steps of: making alignment markings on the repair area; fabricating a pair of alignment templates; preparing the repair area for a hot bonded, vacuum bagged repair; assembling a repair patch; consolidating the repair patch; heating the repair patch; transferring and aligning the repair patch to the repair area; vacuum bagging, heating, and cooling the repair patch for a partial cure at the repair area; heating and cooling the repair patch in an oven; and bonding the repair patch to the repair area.

22 Claims, 7 Drawing Sheets

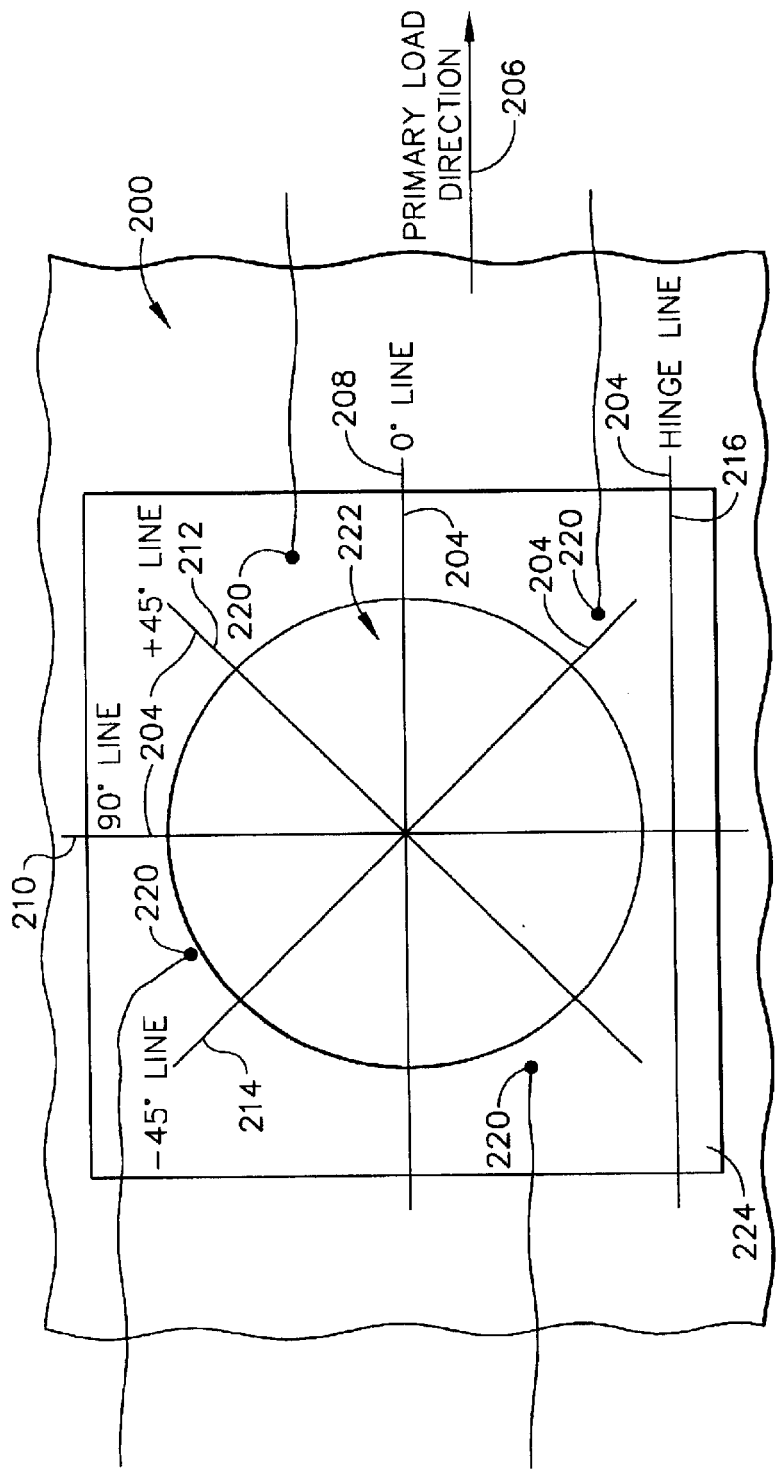
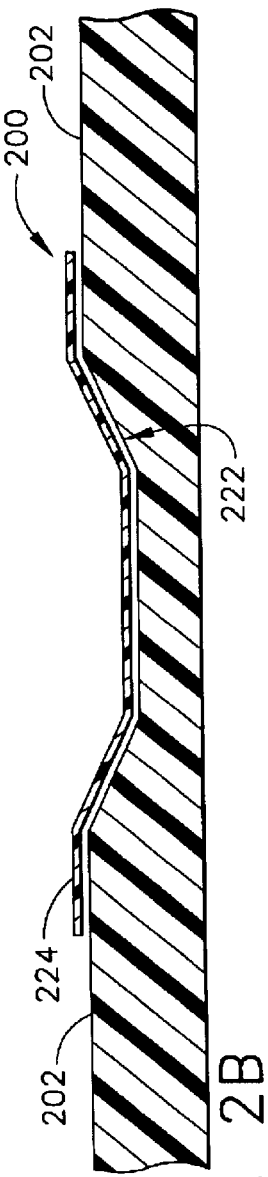
FIG. 2A
FIG. 2B

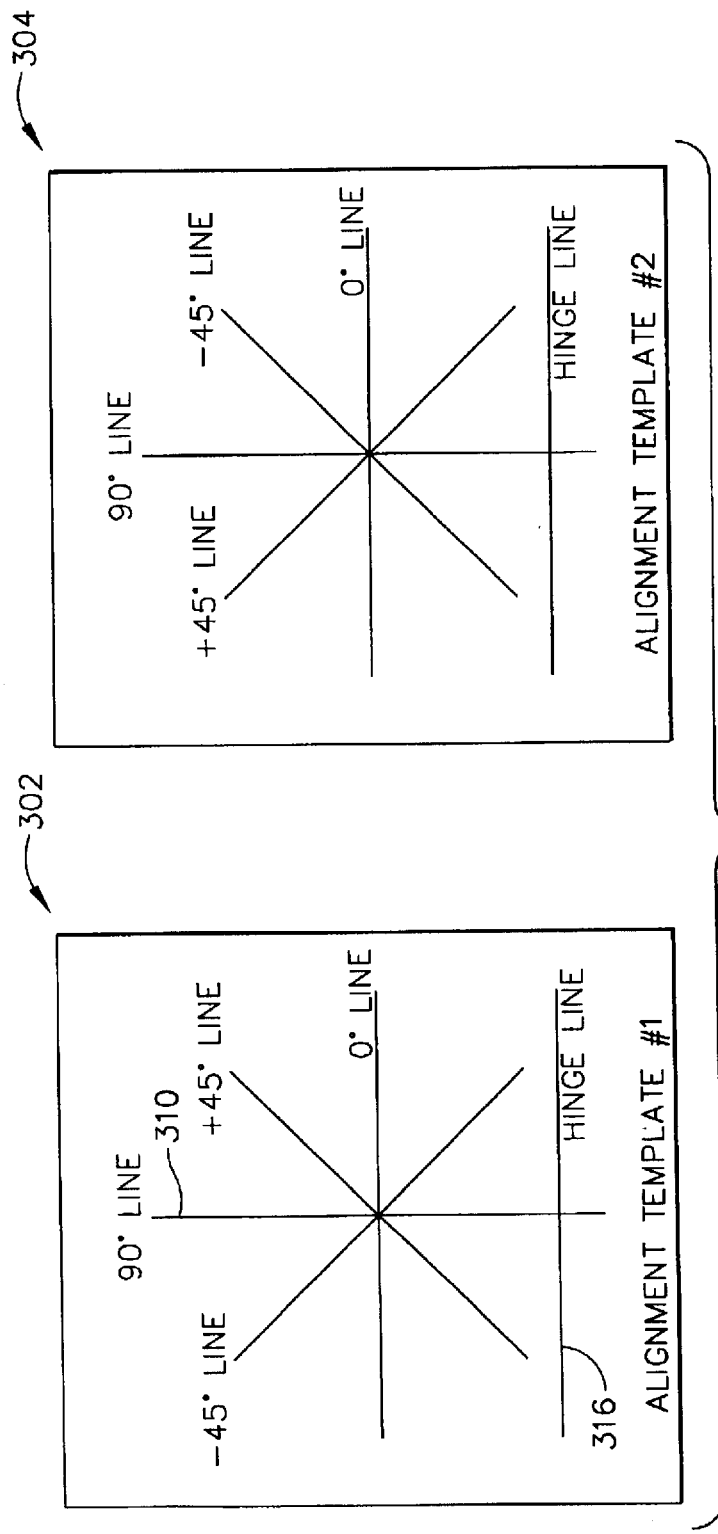

PROCESS METHOD TO REPAIR BISMALEIMIDE (BMI) COMPOSITE STRUCTURES

BACKGROUND OF THE INVENTION

The present invention generally relates to repair of structures fabricated from composite materials and, more particularly, to a process method for repairing aircraft structures fabricated from high temperature materials, such as graphite or fiberglass bismaleimide (BMI) materials.

High performance aircraft, such as military fighters, are typically constructed using composite materials with a higher temperature capability than the composite materials used in other aircraft, such as ordinary commercial aircraft and private aircraft. These higher temperature composite materials, including graphite or fiberglass BMI materials, are being applied to wing, fuselage, and empennage structural components to provide the strength, stiffness, and temperature capability required to fulfill the aircraft's mission. Unfortunately, damage to these structural components is not easily repaired unless a bolted repair can be applied. Bolted repairs, however, will not properly restore the form, fit, and function of many structural components. If a bolted repair is inappropriate, a bonded-on patch repair is required.

The ideal repair of a structural component is one that fully restores its structural integrity to what it was before it was damaged. The best way to achieve full restoration is to use the same materials and processes for repair as those used for initial fabrication. To achieve the required structural and temperature capability in BMI composite materials, the repair material must be processed at a temperature of 375° F. for four hours under high pressure, followed by an additional 6-hour cure at 440° F. The high pressure required is achieved by placing the repair material in a pressurized vessel called an autoclave. Maintenance facilities, however, typically do not have autoclave equipment, relying instead upon vacuum bag technology for curing and bonding of composite repair materials.

Standard vacuum bag repair processes will not produce quality BMI repair patches as the standard process traps air and volatiles from the resin and allows the loss of too much resin into vacuum bagged consumable materials. The resulting repair is resin starved, contains an excessive amount of porosity and voids, and does not have sufficient load-carrying capability. When processing BMI materials, the resin's viscosity becomes extremely low in the 230–280° F. temperature range. The low resin viscosity poses a problem for vacuum bagged processes as excessive resin can bleed very easily into the bagging materials unless a dam system is constructed. Since fiber reinforced BMI impregnated material is fabricated with a very low resin content, any reduction of resin can result in degraded structural properties of the material. Conversely, an air path from the BMI material to the vacuum source is necessary to remove gaseous volatiles and air entrapped within the repair material during the cure process. Prevention of excessive resin bleeding, for example, by incorporating a dam in the vacuum bag, counteracts provision of an adequate air path for proper curing. As vacuum pressure will not suppress the formation of voids as positive pressure can, the BMI repair material resulting from the standard vacuum bag repair process contains excessive porosity and void content, and in some cases, delaminates to the point of falling apart.

In addition, many repairs must be performed while the structural component is installed on the aircraft because the structural component either isn't removable from the airframe or the aircraft operations do not permit removal of the structural component. Consequently, the process of exposing the structural component to the high processing temperature, approximately 375–440° F., can be a safety hazard when performed on the aircraft because, for example, the high processing temperature may exceed the temperature allowed in areas on or near the aircraft containing fuel vapors. Damage to other materials near the repair site may also occur due to the high processing temperature. The general guideline due to these hazards is to limit on-aircraft repair processing temperatures to 350° F. or less.

U.S. Pat. No. 5,958,166, issued Sep. 28, 1999, entitled "Method For Repairing High Temperature Composite Structures" discloses repair processes using standard, albeit high temperature, vacuum bagging processes for polyimides such as PMR-15 and AFR700B. U.S. Pat. No. 5,618,606, issued Apr. 8, 1997, entitled "Process For Bonding Staged Composites With A Cobonded Staged Adhesive And Article" discloses a method to stage epoxy based materials using a non-autoclave vacuum and heating tool to draw off volatiles and partially cure the material for use later. U.S. Pat. No. 5,236,646, issued Aug. 17, 1993, entitled "Process For Preparing Thermoplastic Composites" discloses a process using a dual vacuum chamber apparatus for consolidating fiber-reinforced thermoplastic prepregs into laminates or composites. The prior art, however, addresses neither the problems related to BMI material consolidation described above, such as prevention of excessive resin bleeding and provision of adequate air path for proper curing, nor issues related to on-aircraft repair described above, such as safety and heat damage to other materials near the repair site.

As can be seen, there is a need for a repair process method specifically to repair composite aircraft structures containing BMI resin. There is also a need for a repair process method that can be performed with flight line maintenance personnel and equipment, to contour and cure a BMI repair patch. Moreover, there is a need for a repair process method that can be used to safely and effectively make on-aircraft repairs containing BMI resin.

SUMMARY OF THE INVENTION

The present invention provides a repair process method specifically to repair composite aircraft structures containing BMI resin. The present invention also provides a repair process method that applies a patch consolidation and transfer process, which can be performed with flight line maintenance personnel and equipment, to contour and cure a BMI repair patch. Moreover, the present invention provides a repair process method that can be used to safely and effectively make on-aircraft repairs by bonding a BMI repair patch onto the aircraft structure using conventional bonded repair procedures.

In one aspect of the present invention, a method for repairing a damaged area, referred to as the repair area, of a composite structure comprises steps of:

making alignment markings on the repair area;

fabricating a pair of alignment templates;

preparing the repair area for a hot bonded, vacuum bagged repair;

assembling a repair patch;

consolidating the repair patch;

heating the repair patch;

transferring and aligning the repair patch to the repair area;

vacuum bagging, heating, and cooling the repair patch at the repair area;

heating and cooling the repair patch in an oven; and bonding the repair patch to the repair area.

In another aspect of the present invention, a method for repairing a damaged area, referred to as the repair area, of a composite structure comprises steps of:

making alignment markings on the repair area;

fabricating a pair of alignment templates;

preparing the repair area for a hot bonded, vacuum bagged repair;

assembling a repair patch;

consolidating the repair patch;

heating the repair patch;

transferring and aligning the repair patch to the repair area;

vacuum bagging, heating, and cooling the repair patch at the repair area;

heating and cooling the repair patch in an oven; and bonding the repair patch to the repair area.

The step of preparing the repair area for a hot bonded, vacuum bagged repair further includes:

installing thermocouples in the repair area;

removing a flash tape in a bond area of the repair area and leaving the flash tape outside of the bond area; and covering the repair area with a solid separator film;

The step of assembling a repair patch further includes:

cutting to size plies of fiber-reinforced BMI repair material;

fabricating a ply lay-up template;

taping a first of the pair of alignment templates on the ply lay-up template;

laying up the plies on the alignment template; and affixing a second of the pair of alignment templates to the repair material;

The step of transferring and aligning the repair patch to the repair area further includes:

transferring the repair patch to the repair area;

aligning a remaining one of the pair of alignment templates with the alignment markings on the repair area;

rotating the repair patch to contact the solid separator film covering the repair area; and removing the remaining one of the pair of alignment templates from the repair patch;

In still another aspect of the present invention, a method for repairing a damaged area, referred to as the repair area, of a composite structure comprises steps of:

making alignment markings on the repair area;

fabricating a pair of alignment templates;

preparing the repair area for a hot bonded, vacuum bagged repair;

assembling a repair patch;

consolidating the repair patch;

heating the repair patch;

transferring and aligning the repair patch to the repair area;

vacuum bagging, heating, and cooling the repair patch at the repair area;

heating and cooling the repair patch in an oven; and bonding the repair patch to the repair area.

The step of fabricating a pair of alignment templates further includes centering a piece of transparent bagging film over the repair area; and tracing the alignment markings onto the transparent bagging film.

The step of preparing the repair area for a hot bonded, vacuum bagged repair further includes:

installing thermocouples in the repair area;

removing a flash tape in a bond area of the repair area and leaving the flash tape outside of the bond area; and covering the repair area with a solid separator film;

The step of assembling a repair patch further includes:

cutting to size plies of fiber-reinforced BMI repair material;

fabricating a ply lay-up template;

taping a first of the pair of alignment templates on the ply lay-up template;

laying up the plies on the alignment template; and affixing a second of the pair of alignment templates in an alignment template assembly to the repair material.

The step of consolidating the repair patch further includes:

covering a center area of a plate with insulation;

covering the insulation with a heating blanket;

placing a thin copper sheet over the heating blanket;

covering the copper sheet with a non-porous separator film;

transferring the repair patch onto the non-porous separator film, largest ply down;

removing one of the pair of alignment templates from the repair patch;

placing thermocouples around the repair patch;

placing a porous separator film onto the repair patch;

placing a pricked non-porous separator film onto the porous separator film;

placing a first fiberglass cloth over the pricked non-porous separator film;

vacuum bagging the insulation, the heating blanket, the copper sheet, the non-porous separator film, the repair patch with alignment template assembly, the thermocouples, the porous separator film, the pricked non-porous separator film, and the first fiberglass cloth using a lower vacuum bag;

applying a first vacuum to the lower vacuum bag;

placing a second fiberglass cloth onto the lower vacuum bag;

placing a rigid box onto the second fiberglass cloth so that the rigid box is substantially centered over the repair patch;

placing a third fiberglass cloth over the rigid box;

vacuum bagging the rigid box using an upper vacuum bag; and applying a second vacuum to the upper vacuum bag, so that the second vacuum is at a level ranging between approximately zero inches to one inches of mercury less than the first vacuum;

The step of heating the repair patch further includes:

heating the repair patch at a rate of 3° F. per minute to approximately 250° F.;

holding the repair patch at approximately 250° F. for approximately 15 minutes;

releasing the second vacuum from the upper vacuum bag, opening the upper vacuum bag, and removing the rigid box; the third fiberglass cloth, and the second fiberglass cloth;

holding the repair patch at approximately 250° F. for approximately 15 minutes; and removing the repair patch from the lower vacuum bag;

The step of transferring and aligning the repair patch to the repair area further includes:

transferring the repair patch to the repair area;

aligning the alignment template assembly with the alignment markings on the repair area;

rotating the repair patch to contact the solid separator film covering the repair area; and removing the alignment template assembly from the repair patch;

The step of vacuum bagging, heating, and cooling the repair patch at the repair area further includes:

placing a precut perforated separator film over the repair patch;

placing a fourth fiberglass cloth over the precut perforated separator film;

placing a second solid separator film over the fourth fiberglass cloth;

placing a heat blanket over the second solid separator film;

placing a fifth fiberglass cloth over the heat blanket;

vacuum bagging the repair patch;

heating the repair patch at a rate of 3° F. per minute to approximately 350° F.;

holding the repair patch at approximately 350° F. for approximately 3 hours; and cooling the repair patch at a rate of 3° F. per minute to approximately ambient temperature;

The step of heating and cooling the repair patch in an oven further includes:

marking orientation on the repair patch;

removing the repair patch from the repair area;

placing the repair patch in an oven;

heating the repair patch at a rate of 3° F. per minute to approximately 375° F.;

holding the repair patch at approximately 375° F. for approximately 3 hours;

heating the repair patch at a rate of 3° F. per minute to approximately 440° F.;

holding the repair patch at approximately 440° F. for approximately 6 hours; and cooling the repair patch at a rate of 3° F. per minute to approximately ambient temperature.

These and other features, aspects and advantages of the present invention will become better understood with reference to the following drawings, description and claims.

BRIEF DESCRIPTION OF THE DRAWINGS

FIG. 2A is a top view of an exemplary repair area, i.e., an area to be repaired, illustrating markings, orientations, and solid separator used in accordance with one embodiment of a method to repair a BMI composite structure according to the present invention;

FIG. 2B is a cross sectional view, corresponding to the top view of FIG. 2A, of the exemplary repair area in FIG. 2A;

FIG. 3A is a top view of two alignment templates for a method to repair a BMI composite structure according to one embodiment of the present invention;

FIG. 3B is a cross-sectional view of an alignment template assembly for a method to repair a BMI composite structure according to one embodiment of the present invention;

DETAILED DESCRIPTION OF THE INVENTION

Figure 1:
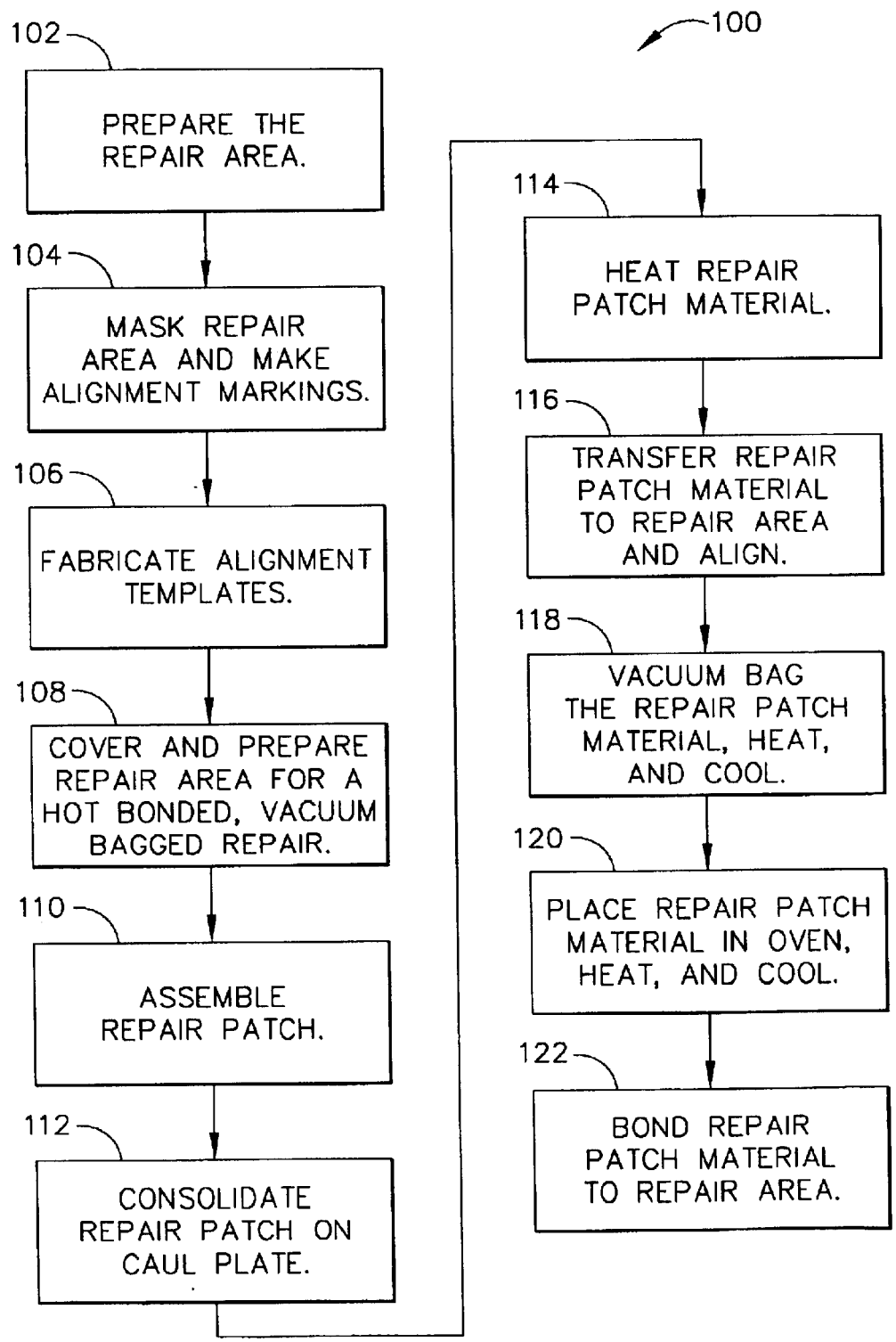
FIG. 1 is a flow chart illustrating steps for a method to repair a bismaleimide (BMI) composite structure according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The repair method of the present invention provides a unique repair process method that was specifically envisioned, developed, and demonstrated to repair composite aircraft structures containing bismaleimide (BMI) resin, which has a higher temperature capability than the composite materials typically used in standard aircraft and may be found, for example, on high performance aircraft such as military fighters. In one embodiment, the invention applies a patch consolidation and transfer process, which can be performed with flight line maintenance personnel and equipment, to contour and cure a BMI repair patch. The patch is then bonded onto the aircraft structure, or structural component using conventional bonded repair procedures. Thus, one embodiment addresses issues related to on-aircraft repair, such as safety and heat damage to materials surrounding the repair site.

The invention overcomes previously unsolved problems in the prior art, encountered when performing a bonded-on patch repair using fiber-reinforced BMI as the repair material. For example, the present invention addresses problems related to BMI material consolidation, such as prevention of excessive resin bleeding and provision of adequate air path for proper curing, so that a repair made according to one embodiment avoids problems associated with prior art repairs, in which the resulting repair is often resin starved, contains an excessive amount of porosity and voids, and does not have sufficient load-carrying capability.

In one embodiment of the invention, a unique bonded process method has been developed to repair BMI composite structures. The method integrates several repair technologies to produce a quality repair that has not been achievable for BMI structures using the several repair technologies separately. In one embodiment, the invention uses a double vacuum debulk arrangement to heat and consolidate the layers of fiber-reinforced BMI repair material before transferring it to the damaged structure for curing. Prior art repairs have used this type of debulk process for consolidation of materials other than BMI, but the repair process method of the present invention includes the use of the double vacuum debulk process in a novel way as part of a repair process for curing high temperature materials, such as BMI. The present invention also modifies the double vacuum debulk process in a novel way to effectively consolidate BMI laminates and combines the modified double vacuum consolidation process with a novel repair material transfer process to minimize BMI resin loss during initial cure. Further items of novelty of the present invention include incorporating a partial cure process at low temperature to accurately contour the BMI material on the aircraft component to resolve the issue of high temperature cure on the aircraft and providing a complete cure capability of the BMI material to obtain full structural properties of the repair material. Moreover, the present invention is novel in resolving the issue of high temperature repair on the aircraft by using a low temperature bond operation onto the aircraft component to produce a quality and structural repair.

To summarize one embodiment, the double vacuum debulk process allows trapped air and volatiles to be evacuated more effectively from the layers of repair material when the process of the invention is performed at the proper time and temperature. The proper time and temperature profile depends upon the type and amount of material to be consolidated. When performed properly, the invention's process results in cured material that has a very low (less than 1%) porosity/void content. The double vacuum debulk technique comprises two vacuum bag arrangements. The first is a lower single vacuum bag arrangement encompassing the repair material. This lower single vacuum bag arrangement is illustrated in detail in FIG. 5 and is referred to as the lower vacuum bag assembly. The second vacuum bag arrangement, which creates the double vacuum bag configuration, is constructed over the lower single bag and is referred to as the upper vacuum bag assembly. This upper vacuum bag assembly comprises a rigid covering or box centered over the repair material and placed onto the single bag. The rigid box is then enclosed with vacuum bag material. The rigid box in the upper bag creates a chamber area over the repair material that relieves the compaction pressure on the repair material when the vacuum level in the upper vacuum bag is approximately equal to or slightly less than the vacuum in the lower single vacuum bag. The key to effectively consolidating the material, however, is to coordinate the use of the double vacuum debulk process with the BMI resin state as it is heated. The double vacuum debulk is most effective when its use corresponds to the resin's minimum viscosity. When this occurs, the temperature is held for a sufficient time to allow the entrapped air and volatiles to be evacuated from the material. Before the resin begins to gel, the vacuum in the upper vacuum bag is released and the rigid box removed in order for the lower vacuum bag to properly compact the repair material. The double bag debulk process described herein is valid for consolidating up to 20 plies of BMI pre-impregnated fabric or tape material. A time and temperature profile for consolidating more plies of BMI pre-impregnated fabric or tape material may be developed.

After the consolidation process, the repair material must be removed from the lower vacuum bag assembly and transferred to the repair location on the structure. The material is then vacuum bagged using standard processes and partially cured. This process of consolidating, temporarily cooling, transferring, and reheating the BMI repair material minimizes resin loss and accurately forms the repair material to the shape of the structural component. The repair material is not bonded to the structure during this process in order that it may be removed and further cured in an oven to obtain optimum structural properties. The fully cured repair material is then bonded to the damaged structure using an adhesive and a standard hot bonded vacuum bag repair process.

Referring now to FIG. 1, a flow chart illustrates repair process 100 for repairing a BMI composite structure according to one embodiment of the present invention. Each of steps 102, 104, 106, 108, 110, 112, 114, 116, 118, 120, and 122 of repair process 100, seen in the flow chart of FIG. 1, is described in more detail below with reference to FIGS. 2 through 7.

Referring now to FIGS. 2A and 2B, repair area 200 provides an example, for illustrating repair process 100, of an area of a BMI composite structure to be repaired according to the method of the invention. Repair area 200 may result, for example, from damage to an aircraft structural component.

Corresponding to step 102 of FIG. 1, repair area 200, seen in FIGS. 2A and 2B, is prepared for repair material cure. Damaged material may be removed from repair area 200 per engineering direction for repair material application. The surface 202 of repair area 200 may be cleaned using the appropriate solvents or cleansers.

Corresponding to step 104 of FIG. 1, repair area 200 is masked and alignment markings 204 are marked onto repair area 200 using an approved marker as follows.

First, determine the primary load direction 206 in the damaged repair area 200. Lay out and draw a thin line 208 running through the center of the damaged repair area 200 and parallel to primary load direction 206. Apply flash tape to mask repair area surface 202 prior to drawing line 208. Use a permanent marker in a contrasting color and extend line 208 six to eight inches beyond the damaged repair area 200. Label line 208 "0°."

Second, lay out and draw a thin line, 90° line 210, running through the center of the damaged repair area 200 and perpendicular to primary load direction 206. Apply flash tape to repair area surface 202 prior to drawing 90° line 210. Use a permanent marker in a contrasting color and extend 90° line 210 six to eight inches beyond the damaged repair area 200. Label 90° line 210 "90°."

Third, in a similar manner, layout and draw thin lines 212 and 214 through the center of the damaged repair area 200 at +45° and −45° to primary load direction 206. Apply flash tape to repair area surface 202 prior to drawing lines 212 and 214. Use a permanent marker in a contrasting color and extend lines 212, 214 six to eight inches beyond the damaged repair area 200. Label lines 212, 214 "+45°" and "−45°" respectively.

Fourth and finally, several inches outside of the damaged repair area 200, lay out and draw a thin line, hinge line 216, running parallel to primary load direction 206. Apply flash tape to repair area surface 202 prior to drawing hinge line 216. Use a permanent marker in a contrasting color and extend hinge line 216 six to eight inches beyond the damaged repair area 200. Label hinge line 216 "hinge". Ensure the 90° line 210 extends beyond hinge line 216.

Referring now to FIGS. 3A and 3B, two transparent alignment templates 302, 304 are fabricated, corresponding to step 106 of FIG. 1, as follows.

First, cut two pieces of transparent bagging film eight to ten inches larger than the damaged repair area 200.

Second, center one of the two pieces of transparent bagging film over the damaged repair area 200 and tape it in place temporarily at each corner. Ensure the bagging film is taut with no wrinkles.

Third, trace each of the five lines 208, 210, 212, 214, and 216 previously drawn on the damaged repair area 200 onto the bagging film with a permanent marker to form corresponding lines on the bagging film. For example, 90° line 210 may be traced onto the bagging film as 90° line 310, and hinge line 216 may be traced to form hinge line 316 on the bagging film. Label this piece of bagging film "Alignment Template #1". This is alignment template 302. Remove alignment template 302.

Fourth, repeat this procedure of centering and tracing (second and third steps) with the second piece of transparent bagging film and label it "Alignment Template #2". Reverse the plus and minus signs for the 45° lines on Alignment Template #2 as it will be used upside down for ply lay-up. This is alignment template 304. Remove alignment template 304.

Fifth, cut a square piece of porous separator film 311 two inches larger than the damaged repair area and tape it to the non-ink side of Alignment Template #1, i.e., alignment template 302. Ensure the separator film is centered prior to taping and that all wrinkles have been removed. Tape around the entire periphery.

Sixth and lastly, cut a piece of perforated separator film 312 approximately the same size as the porous separator film and tape it to the porous separator film. Ensure the perforated separator film is centered prior to taping and that all wrinkles have been removed. Tape around the entire periphery using flash tape 315. Alignment Template #1, i.e., alignment template 302, with porous separator film 311 and perforated separator film 312 taped to it is called alignment template assembly 320.

Referring again to FIG. 2, repair area 200 is prepared for a hot bonded, vacuum bagged repair and covered, corresponding to step 108 of FIG. 1. Thermocouples 220 for temperature monitoring and control are installed according to standard procedure in repair area 200. The flash tape in bond area 222 is removed, leaving the flash tape in place outside of bond area 222 for repair material alignment. Repair area 200 is then covered with a solid separator film 224 that is taped in place. Standard vacuum bag materials are prepared for performing a hot bonded, vacuum bagged repair, as more fully described below with reference to FIG. 7.

Figure 4A:
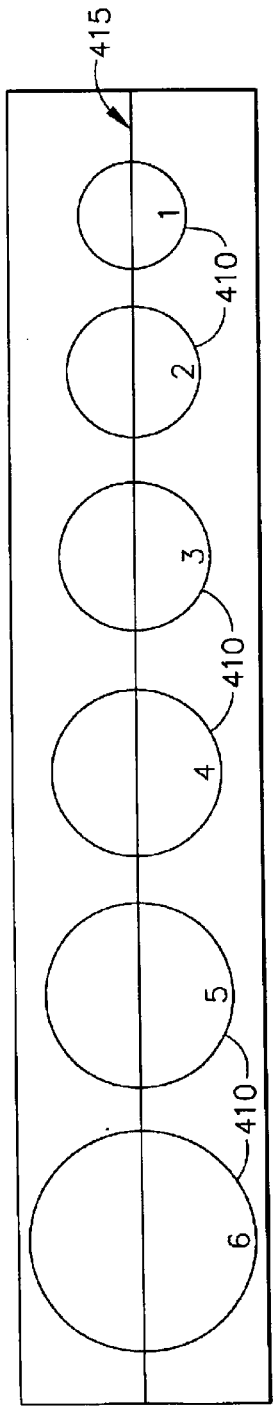
FIG. 4A is a top view of repair patch material depicting the outline and marking of individual repair plies for a method to repair a BMI composite structure according to one embodiment of the present invention.
Figure 4B:
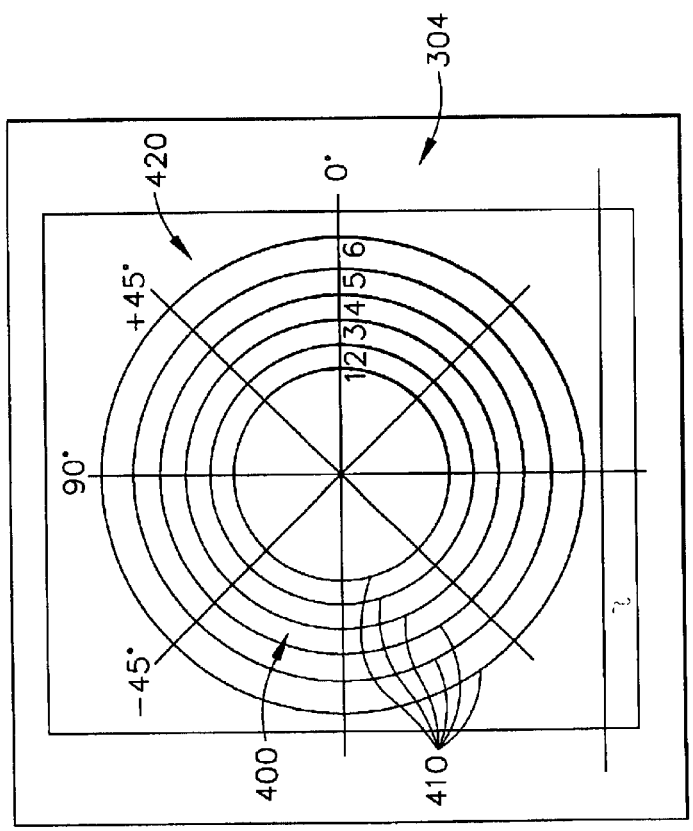
FIG. 4B is a diagram of repair patch material lay-up, including a transparent alignment template on top of a lay-up template, for a method to repair a BMI composite structure according to one embodiment of the present invention.

Referring to FIGS. 4A and 4B, a repair patch 400 may be assembled, corresponding to step 110 of FIG. 1. The required layers or plies 410 of fiber-reinforced BMI repair material are cut to size. Each ply 410 is numbered and marked on the backing film with a line 415 indicating the direction of the 0° fiber orientation. The plies 410 are aligned and stacked according to the repair design as follows.

First, fabricate a ply lay-up template 420 that indicates the ply outlines and ply numbers, as well as orientation markings that locate the geometric center of the plies and correspond to the lines marked on the alignment templates. Paper or film can be used for the template. Tape the template down onto a clean flat surface. Ensure the paper or film is taut without any wrinkles.

Second, tape Alignment Template #2, i.e., alignment template 304, onto the ply lay-up template 420 such that it is centered and placed upside down so the alignment markings will not contaminate the plies 410 during lay-up.

Third, lay-up the repair plies 410 as follows. Cut a small piece of two-sided tape and place it on the backing paper of the smallest ply 410 and tape the smallest ply 410 in position on alignment template 304. Ensure the orientation of the smallest ply 410 is correct, for example, by using line 415. Lay-up the remaining plies 410, working from smallest to largest. Remove the backing paper from each ply 410 and ensure each ply's 410 orientation is correct before placing it down on the previously applied ply 410.

Fourth, after all plies 410 are laid up, place alignment template assembly 320, which includes Alignment Template #1, directly over the lay-up of repair patch 400, perforated separator film side down, and align it with Alignment Template #2, i.e., alignment template 304. Press firmly together to affix alignment template assembly 320 to the repair material of repair patch 400.

Figure 5:
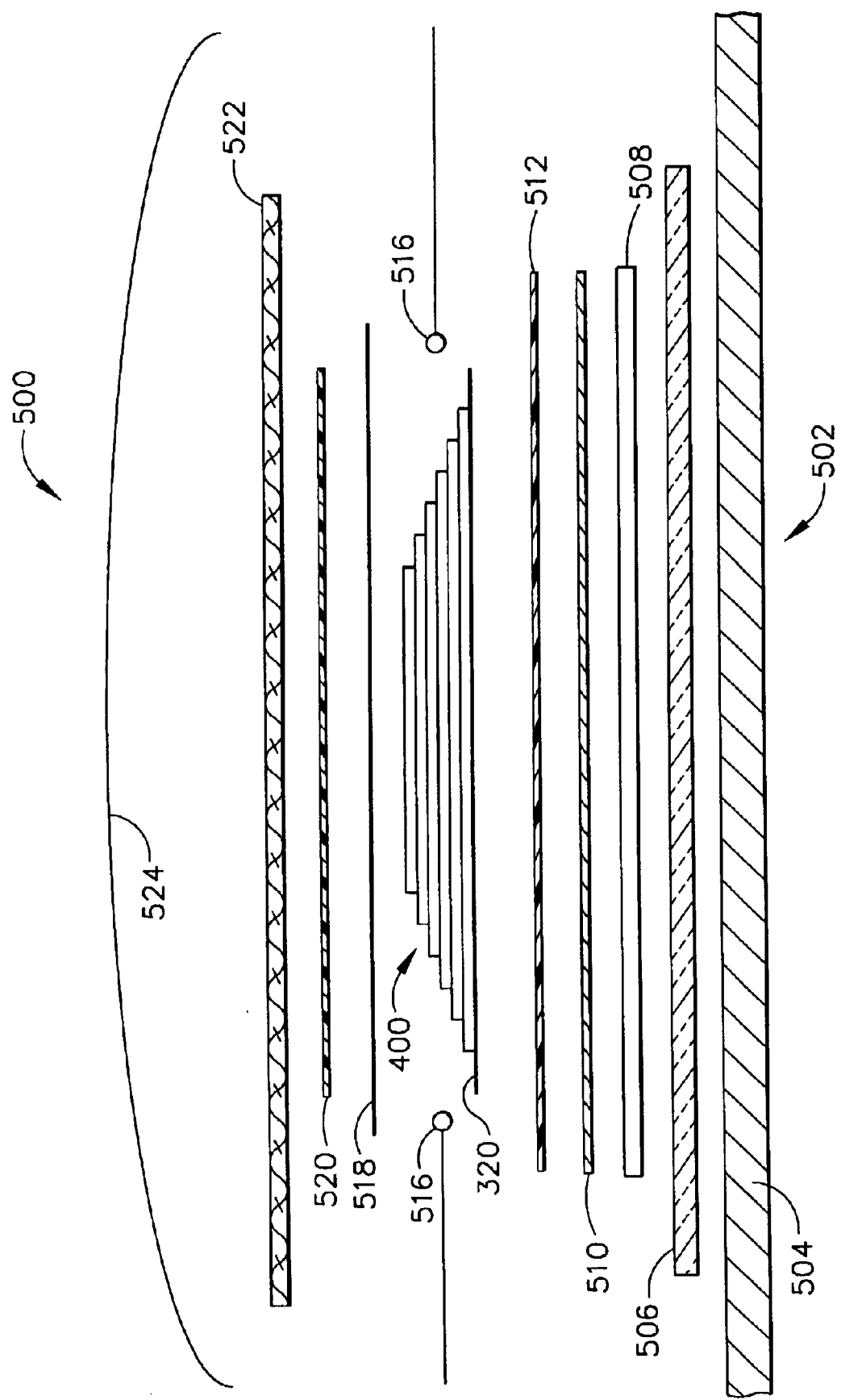
FIG. 5 is a cross-sectional schematic diagram illustrating a lower vacuum bag assembly for a method to repair a BMI composite structure according to one embodiment of the present invention.

Referring now to FIG. 5, lower vacuum bag assembly 500 may be used to consolidate repair patch 400, corresponding to step 112 of FIG. 1. A repair material consolidation area 502 for using the double vacuum debulk process is prepared. A metallic plate 504 with a smooth surface is obtained of sufficient size and thickness. Plate 504 may also be referred to as a caul plate. The center of plate 504 is covered with insulation 506 material in the center area. The insulation 506 is covered with a heating blanket 508 of proper size. A thin copper sheet 510 is placed over heating blanket 508. The copper sheet 510 is covered with non-porous separator film 512. The stacked repair patch 400 material is transferred to the consolidation area 502 as follows: Remove the stacked plies 410 of repair patch 400, with alignment template assembly 320 attached, from the lay-up area and flip it, i.e., repair patch 400 with alignment template assembly 320 attached, over so that the largest ply 410 and alignment template assembly 320, are on the bottom. Center and place it, i.e., repair patch 400 with alignment template assembly 320 attached, onto the non-porous separator film 512. Tape down the corners of alignment template assembly 320. Alignment Template #2, i.e., alignment template 304, and the backing paper from the top ply 410 is removed.

Still referring to FIG. 5, thermocouples 516 are placed around the perimeter of the repair patch 400 material. A porous separator film 518 is placed onto the repair patch 400 material followed by a non-porous separator film 520 that has been pricked with 4–8 pinholes that are evenly distributed over the repair patch material. Two layers of fiberglass cloth 522 are placed over the non-porous separator film 520. This assembly, which may comprise plate 504, insulation 506, heating blanket 508, copper sheet 510, non-porous separator film 512, repair patch 400 with alignment template assembly 320 attached, thermocouples 516, porous separator film 518, non-porous separator film 520, and fiberglass cloth 522 is then vacuum bagged with bagging film 524 according to standard procedure. Full vacuum is then applied to the vacuum bag. This, i.e., the assembly just described and including bagging film 524, with full vacuum applied, is called the lower vacuum bag assembly 500.

Figure 6:
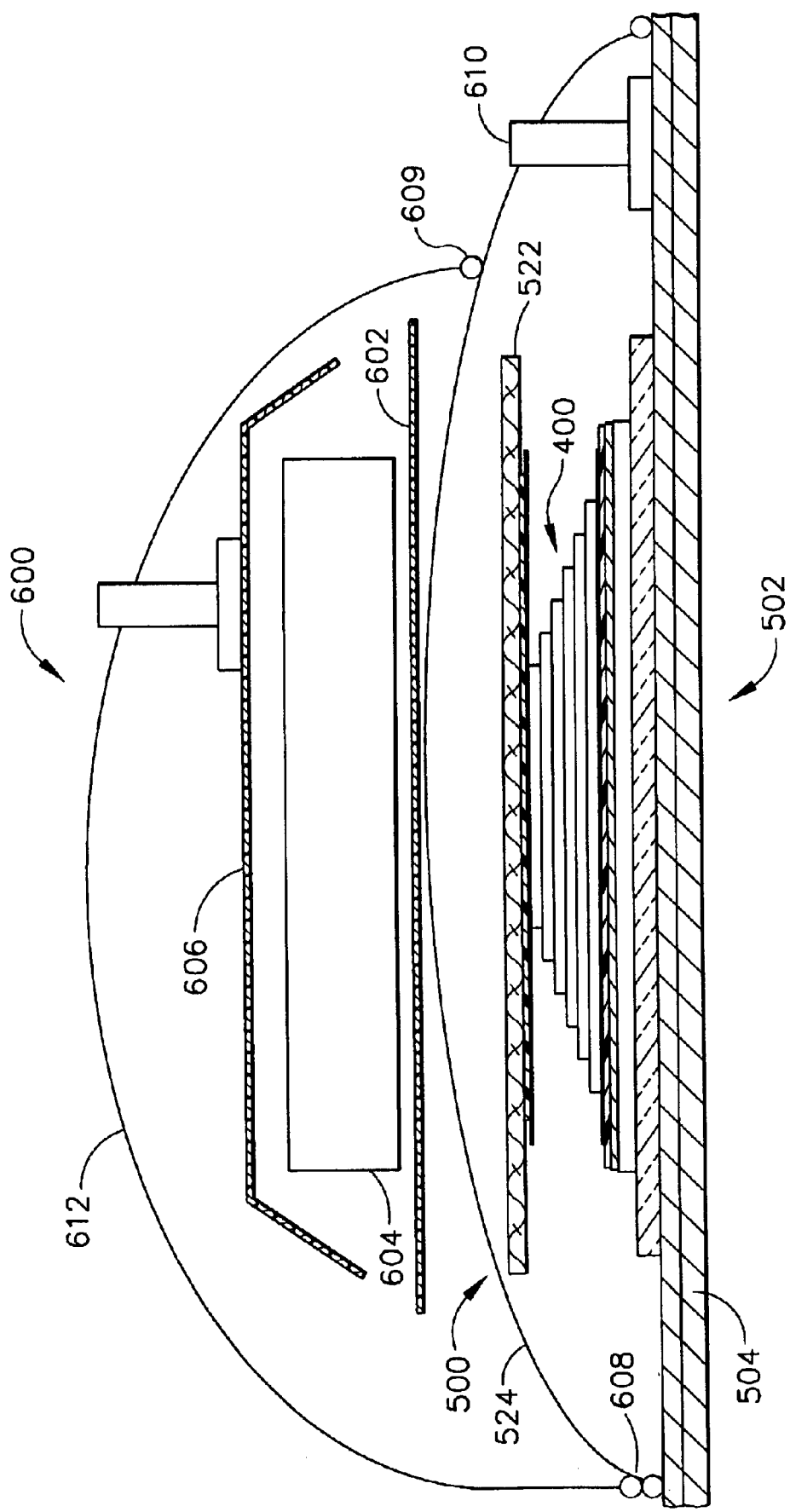
FIG. 6 is a cross-sectional schematic diagram illustrating an upper vacuum bag assembly over a lower vacuum bag assembly for a method to repair a BMI composite structure according to one embodiment of the present invention.

Referring now to FIG. 6, several layers of heavy fiberglass cloth 602 are centered over the repair patch 400 material location and placed onto the lower vacuum bag assembly 500. A rigid box 604 is centered over the repair patch 400 material location and placed onto the fiberglass cloth 602. More layers of heavy fiberglass cloth 606 are placed over the rigid box 604. Vacuum bag sealant tape 608 is applied over the lower vacuum bag assembly 500 sealant tape 608 except in the vacuum port 610 locations where the sealant tape 609 is placed inside of these ports. The rigid box 604 and materials, which may include fiberglass cloth 602, 606, and lower vacuum bag assembly 500, are vacuum bagged, according to standard procedures, with bagging film 612 to create an upper vacuum bag 600. Vacuum is applied and maintained in the upper vacuum bag assembly 600 such that the upper vacuum level is equal to or slightly less than the lower vacuum level (tolerance is +0, −1 inches of mercury). If the vacuum in the upper chamber were greater than the vacuum in the lower vacuum bag, the vacuum in the upper chamber would effectively suck the lower vacuum bag and materials up into the upper chamber, damaging or destroying the repair material. If separate vacuum sources are used, the difference between upper and lower vacuum levels needs to be monitored and controlled. If the same vacuum source is used for both vacuum assemblies and the proper sequence of vacuum application is performed, the two vacuum levels will equalize. This equalization removes any compaction pressure onto the repair materials. Continuing with FIG. 6, the time and temperature profile for consolidating the BMI repair patch 400 material is as follows. Heat is applied, corresponding to step 114 of FIG. 1, to the repair patch 400 material at a rate of 3° F. per minute until the temperature reaches 250° F. The temperature is then held for 15 minutes. After 15 minutes at 250° F., the vacuum in the upper vacuum bag 600 is released and the box assembly removed, including rigid box 604 and fiberglass cloth 602, 606. The temperature is held an additional 15 minutes, i.e., a second 15-minute hold. After the second 15-minute hold, the lower vacuum bag assembly 500 is opened up in order to remove the repair patch 400 material from the consolidation area 502.

Figure 7:
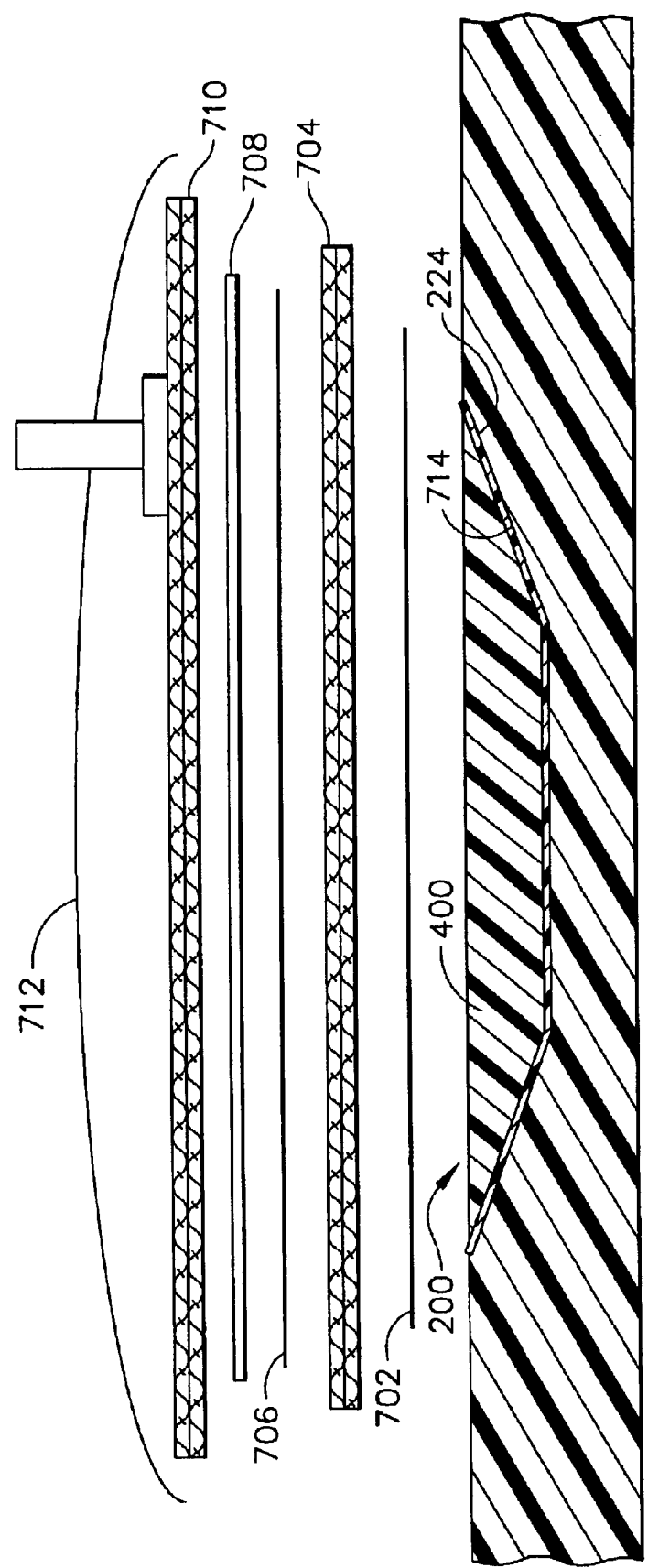
FIG. 7 is a cross-sectional schematic diagram illustrating vacuum bagged repair patch material in an exemplary repair area for a method to repair a BMI composite structure according to one embodiment of the present invention.

Referring now to FIG. 7, the repair patch 400 material is transferred to the prepared repair area 200 on the structure, as seen in FIG. 7, corresponding to step 116 of FIG. 1, as follows. Pick-up the repair patch 400 material using alignment template assembly 320, from consolidation area 502 and place it opposite to repair area 200 such that hinge line 316 of alignment template assembly 320 and hinge line 216 drawn on the structure are collinear. Two people standing at opposite ends of hinge lines 216, 316 keep alignment template assembly 320 taut by each person holding two of the template's four corners closest to that person. The hinge line edge of alignment template assembly 320 is then folded under and aligned with hinge line 216 drawn on the structure. Alignment template assembly 320 is then slid along the collinear hinge lines 216 and 316 until its 90° line 310 and the 90° line 210 on the structure meet. At this point the tautly held alignment template assembly 320 is rotated about hinge line 316 until the repair patch 400 material contacts the layer of solid separator film 224 in repair area 200.

Again referring to FIG. 7, repair patch 400 material is vacuum bagged, heated and cooled, corresponding to step 118 of FIG. 1. A precut layer of perforated separator film 702, having a grid of 5 mil holes with a three-inch spacing, is placed over the repair patch 400 material to minimize resin bleed. Two layers of fiberglass cloth 704 are placed over the perforated separator film 702, followed by a solid separator film 706, a heat blanket 708, and then two more layers of fiberglass cloth 710. The repair patch 400 material is vacuum bagged with bagging film 712, full vacuum applied, and heat is introduced at 3° F. per minute. The temperature is held at 350° F. for three hours and then cooled at 3° F. per minute to ambient temperature.

Upon cooling, the vacuum bag is removed, orientation is marked on the partially cured repair patch 400 material, then it is removed from repair area 200 and placed in an oven for final curing, corresponding to step 120 of FIG. 1. The final cure is a ramp of 3° F. per minute to 375° F. and held for three hours. The temperature is increased 3° F. per minute to 440° F. and held for six hours. The fully cured repair material is then cooled at 3° F. per minute to ambient temperature.

The fully cured repair patch 400 material is then bonded to the structure's repair area 200, corresponding to step 122 of FIG. 1. Repair patch 400 may be bonded to repair area 200 using a film adhesive selected for the service environment of the structure. The bonding surface 714 is cleaned, the adhesive cut and applied to bonding surface 714, and then covered by the repair patch 400 material, ensuring proper alignment and centering of the patch. The adhesive and repair patch 400 material may be vacuum bagged and cured using a heat blanket as required.

It should be understood, of course, that the foregoing relates to preferred embodiments of the invention and that modifications may be made without departing from the spirit and scope of the invention as set forth in the following claims.

We claim:

1. A method for repairing a damaged repair area of a composite structure, comprising steps of:

making alignment markings on the repair area;

fabricating a pair of alignment templates;

preparing the repair area for a hot bonded, vacuum bagged repair;

assembling a repair patch;

consolidating said assembled repair patch;

heating said consolidated repair patch;

transferring and aligning said consolidated and heated repair patch to the repair area;

vacuum bagging, heating, and cooling said transferred and aligned repair patch at the repair area;

removing said vacuum bagged, heated and cooled repair patch from the repair area heating and cooling said removed repair patch in an oven; and bonding said oven heated and cooled repair patch to the repair area.

2. The method of claim 1 further comprising a step, before said step of making alignment markings, of preparing the repair area wherein damaged material is removed from the repair area and a surface of the repair area is cleaned.

3. The method of claim 1 wherein said step of making alignment markings comprises marking a hinge line and a 90° line.

4. The method of claim 1 wherein said fabricating step comprises steps of centering a piece of transparent bagging film over the repair area; and tracing said alignment markings onto said transparent bagging film.

5. The method of claim 1 wherein said preparing step comprises steps of:

installing thermocouples in the repair area;

removing a flash tape in a bond area of the repair area and leaving the flash tape outside of the bond area; and covering the repair area with a solid separator film.

6. The method of claim 5 wherein said assembling step comprises:

cutting to size plies of fiber-reinforced bismaleimide repair material;

fabricating a ply lay-up template;

taping a first of said pair of alignment templates on said ply lay-up template;

laying up said plies on said first of said pair of alignment templates; and affixing a second of said pair of alignment templates to said repair material.

7. The method of claim 1 wherein said consolidating step comprises steps of:

covering a center area of a plate with insulation;

covering said insulation with a heating blanket;

placing a thin copper sheet over said heating blanket;

covering said copper sheet with a non-porous separator film;

transferring said repair patch onto said non-porous separator film;

removing one of said pair of alignment templates from said repair patch;

placing thermocouples around said repair patch;

placing a porous separator film onto said repair patch;

placing a pricked non-porous separator film onto said porous separator film;

placing a first fiberglass cloth over said pricked non-porous separator film;

vacuum bagging said insulation, said heating blanket, said copper sheet, said non-porous separator film, said repair patch with one of said pair of alignment templates, said thermocouples, said porous separator film, said pricked non-porous separator film, and said first fiberglass cloth using a lower vacuum bag;

applying a first vacuum to said lower vacuum bag;

placing a second fiberglass cloth onto said lower vacuum bag;

placing a rigid box onto said second fiberglass cloth wherein said rigid box is substantially centered over said repair patch;

placing a third fiberglass cloth over said rigid box;

vacuum bagging said rigid box using an upper vacuum bag; and applying a second vacuum to said upper vacuum bag, wherein said second vacuum is at a level ranging between zero inches to approximately one inch of mercury less than said first vacuum.

8. The method of claim 7 wherein said heating of said consolidated repair patch step comprises:

heating said repair patch at a rate of 3° F. per minute to approximately 250° F.;

holding said repair patch at approximately 250° F. for approximately 15 minutes;

releasing said second vacuum from said upper vacuum bag, opening said upper vacuum bag, and removing said rigid box; said third fiberglass cloth, and said second fiberglass cloth;

holding said repair patch at approximately 250° F. for approximately 15 minutes; and removing said repair patch from said lower vacuum bag.

9. The method of claim 6 wherein said transferring and aligning step comprises:

transferring said repair patch to the repair area;

aligning one of said pair of alignment templates with said alignment markings on the repair area; and rotating said repair patch to contact said solid separator film covering the repair area; and removing said one of said pair of alignment templates from said repair patch.

10. The method of claim 1 wherein said vacuum bagging, heating, and cooling step comprises:

placing a precut perforated separator film over the repair patch;

placing a fourth fiberglass cloth over said precut perforated separator film;

placing a second solid separator film over said fourth fiberglass cloth;

placing a heat blanket over said second solid separator film;

placing a fifth fiberglass cloth over said heat blanket;

vacuum bagging said repair patch;

heating said repair patch at a rate of 3° F. per minute to approximately 350° F.;

holding said repair patch at approximately 350° F. for approximately 3 hours; and cooling said repair patch at a rate of 3° F. per minute to approximately ambient temperature.

11. The method of claim 1 wherein said heating and cooling in an oven step comprises:

marking orientation on the repair patch;

removing the repair patch from the repair area;

placing the repair patch in an oven;

heating said repair patch at a rate of 3° F. per minute to approximately 375° F.;

holding said repair patch at approximately 375° F. for approximately 3 hours;

heating said repair patch at a rate of 3° F. per minute to approximately 440° F.;

holding said repair patch at approximately 440° F. for approximately 6 hours; and cooling said repair patch at a rate of 3° F. per minute to approximately ambient temperature.

12. A method for repairing a damaged repair area of a composite structure, comprising steps of:

making alignment markings on the repair area;

fabricating a pair of alignment templates;

preparing the repair area for a hot bonded, vacuum bagged repair by:

installing thermocouples in the repair area, removing a flash tape in a bond area of the repair area and leaving the flash tape outside of the bond area, and covering the repair area with a solid separator film;

assembling a repair patch by:

cutting to size plies of fiber-reinforced bismaleimide repair material, fabricating a ply lay-up template, taping a first of said pair of alignment templates on said ply lay-up template, laying up said plies on said first of said pair of alignment templates, and affixing a second of said pair of alignment templates to said repair material;

consolidating said assembled repair patch;

heating said consolidated repair patch;

transferring and aligning said consolidated and heated repair patch to the repair area by:

transferring said repair patch to the repair area, aligning one of said pair of alignment templates with said alignment markings on the repair area, rotating said repair patch to contact said solid separator film covering the repair area, and removing said one of said pair of alignment templates from said repair patch;

vacuum bagging, heating, and cooling said transferred and aligned repair patch at the repair area;

removing said bagged, heated and cooled repair patch from the repair area heating and cooling said removed repair patch in an oven; and bonding said oven heated and cooled repair patch to the repair area.

13. The method of claim 12 further comprising a step, before said step of making alignment markings, of preparing the repair area wherein damaged material is removed from the repair area and a surface of the repair area is cleaned.

14. The method of claim 12 wherein said step of making alignment markings comprises marking a hinge line and a 90° line.

15. The method of claim 12 wherein said step of fabricating alignment templates comprises steps of centering a piece of transparent bagging film over the repair area; and tracing said alignment markings onto said transparent bagging film.

16. The method of claim 12 wherein said consolidating step comprises steps of:

covering a center area of a plate with insulation;

covering said insulation with a heating blanket;

placing a thin copper sheet over said heating blanket;

covering said copper sheet with a non-porous separator film;

transferring said repair patch onto said non-porous separator film;

removing one of said pair of alignment templates from said repair patch;

placing thermocouples around said repair patch;

placing a porous separator film onto said repair patch;

placing a pricked non-porous separator film onto said porous separator film;

placing a first fiberglass cloth over said pricked non-porous separator film;

vacuum bagging said insulation, said heating blanket, said copper sheet, said non-porous separator film, said repair patch with one of said pair of alignment templates, said thermocouples, said porous separator film, said pricked non-porous separator film, and said first fiberglass cloth using a lower vacuum bag;

applying a first vacuum to said lower vacuum bag;

placing a second fiberglass cloth onto said lower vacuum bag;

placing a rigid box onto said second fiberglass cloth wherein said rigid box is substantially centered over said repair patch;

placing a third fiberglass cloth over said rigid box;

vacuum bagging said rigid box using an upper vacuum bag; and applying a second vacuum to said upper vacuum bag, wherein said second vacuum is at a level ranging between zero inches through approximately one inch of mercury less than said first vacuum.

17. The method of claim 16 wherein said heating of said consolidated repair patch step comprises:

heating said repair patch at a rate of 3° F. per minute to approximately 250° F.;

holding said repair patch at approximately 250° F. for approximately 15 minutes;

releasing said second vacuum from said upper vacuum bag, opening said upper vacuum bag, and removing said rigid box; said third fiberglass cloth, and said second fiberglass cloth;

holding said repair patch at approximately 250° F. for approximately 15 minutes; and removing said repair patch from said lower vacuum bag.

18. The method of claim 12 wherein said vacuum bagging, heating, and cooling step comprises:

placing a precut perforated separator film over the repair patch;

placing a fourth fiberglass cloth over said precut perforated separator film;

placing a second solid separator film over said fourth fiberglass cloth;

placing a heat blanket over said second solid separator film;

placing a fifth fiberglass cloth over said heat blanket;

vacuum bagging said repair patch;

heating said repair patch at a rate of 3° F. per minute to approximately 350° F.;

holding said repair patch at approximately 350° F. for approximately 3 hours; and cooling said repair patch at a rate of 3° F. per minute to approximately ambient temperature.

19. The method of claim 12 wherein said heating and cooling in an oven step comprises:

marking orientation on the repair patch;

removing the repair patch from the repair area;

placing the repair patch in an oven;

heating said repair patch at a rate of 3° F. per minute to approximately 375° F.;

holding said repair patch at approximately 375° F. for approximately 3 hours;

heating said repair patch at a rate of 3° F. per minute to approximately 440° F.;

holding said repair patch at approximately 440° F. for approximately 6 hours; and cooling said repair patch at a rate of 3° F. per minute to approximately ambient temperature.

20. A method for repairing a damaged repair area of a composite structure, comprising steps of:

making alignment markings on the repair area;

fabricating a pair of alignment templates by centering a piece of transparent bagging film over the repair area and tracing said alignment markings onto said transparent bagging film;

preparing the repair area for a hot bonded, vacuum bagged repair by:
  installing thermocouples in the repair area,
  removing a flash tape in a bond area of the repair area and leaving the flash tape outside of the bond area, and
  covering the repair area with a solid separator film;

assembling a repair patch by:
  cutting to size plies of fiber-reinforced bismaleimide repair material,
  fabricating a ply lay-up template,
  taping a first of said pair of alignment templates on said ply lay-up template,
  laying up said plies on said alignment template, and
  affixing a second of said pair of alignment templates in an alignment template assembly to said repair material;

consolidating said assembled repair patch by:
  covering a center area of a plate with insulation,
  covering said insulation with a heating blanket,
  placing a thin copper sheet over said heating blanket,
  covering said copper sheet with a non-porous separator film,
  transferring said repair patch onto said non-porous separator film, largest ply down,
  removing one of said pair of alignment templates from said repair patch,
  placing thermocouples around said repair patch,
  placing a porous separator film onto said repair patch,
  placing a pricked non-porous separator film onto said porous separator film,
  placing a first fiberglass cloth over said pricked non-porous separator film,
  vacuum bagging said insulation, said heating blanket, said copper sheet, said non-porous separator film, said repair patch with said alignment template assembly, said thermocouples, said porous separator film, said pricked non-porous separator film, and said first fiberglass cloth using a lower vacuum bag,
  applying a first vacuum to said lower vacuum bag,
  placing a second fiberglass cloth onto said lower vacuum bag,
  placing a rigid box onto said second fiberglass cloth wherein said rigid box is substantially centered over said repair patch,
  placing a third fiberglass cloth over said rigid box,
  vacuum bagging said rigid box using an upper vacuum bag, and
  applying a second vacuum to said upper vacuum bag, wherein said second vacuum is at a level ranging between zero inches through approximately one inch of mercury less than said first vacuum;
heating said consolidated repair patch by:
  heating said repair patch at a rate of 3° F. per minute to approximately 250° F.,
  holding said repair patch at approximately 250° F. for approximately 15 minutes,
  releasing said second vacuum from said upper vacuum bag, opening said upper vacuum bag, and removing said rigid box; said third fiberglass cloth, and said second fiberglass cloth,
  holding said repair patch at approximately 250° F. for approximately 15 minutes, and
  removing said repair patch from said lower vacuum bag;
transferring and aligning said consolidated and heated repair patch to the repair area by:
  transferring said repair patch to the repair area,
  aligning said alignment template assembly with said alignment markings on the repair area,
  rotating said repair patch to contact said solid separator film covering the repair area, and
  removing said alignment template assembly from said repair patch;
vacuum bagging, heating, and cooling said transferred and aligned repair patch at the repair area by:
  placing a precut perforated separator film over the repair patch,
  placing a fourth fiberglass cloth over said precut perforated separator film,
  placing a second solid separator film over said fourth fiberglass cloth,
  placing a heat blanket over said second solid separator film,
  placing a fifth fiberglass cloth over said heat blanket,
  vacuum bagging said repair patch,
  heating said repair patch at a rate of 3° F. per minute to approximately 350° F.,
  holding said repair patch at approximately 350° F. for approximately 3 hours, and
  cooling said repair patch at a rate of 3° F. per minute to approximately ambient temperature;
removing said vacuum bagged, heated and cooled repair patch from the repair area heating and cooling said removed repair patch in an oven by:
  marking orientation on the repair patch;
  removing the repair patch from the repair area,
  placing the repair patch in an oven,
  heating said repair patch at a rate of 3° F. per minute to approximately 375° F.,
  holding said repair patch at approximately 375° F. for approximately 3 hours,
  heating said repair patch at a rate of 3° F. per minute to approximately 440° F.,
  holding said repair patch at approximately 440° F. for approximately 6 hours, and
  cooling said repair patch at a rate of 3° F. per minute to approximately ambient temperature; and
bonding said oven heated and cooled repair patch to the repair area.

21. The method of claim 20 further comprising a step, before said step of making alignment markings, of preparing the repair area wherein damaged material is removed from the repair area and a surface of the repair area is cleaned.

22. The method of claim 20 wherein said step of making alignment markings comprises marking a hinge line and a 90° line.

* * * * *